United States Patent
Mu (10) Patent No.: US 11,881,953 B2
(45) Date of Patent: Jan. 23, 2024

(54) HYBRID AUTOMATIC REPEAT REQUEST (HARQ) FEEDBACK METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 601 days.

(21) Appl. No.: 17/281,878

(22) PCT Filed: Aug. 8, 2018

(86) PCT No.: PCT/CN2018/099473
§ 371 (c)(1),
(2) Date: Mar. 31, 2021

(87) PCT Pub. No.: WO2020/029144
PCT Pub. Date: Feb. 13, 2020

(65) Prior Publication Data
US 2022/0052801 A1 Feb. 17, 2022

(51) Int. Cl.
*H04L 1/1867* (2023.01)
*H04L 1/1812* (2023.01)
*H04L 5/14* (2006.01)

(52) U.S. Cl.
CPC .......... *H04L 1/1887* (2013.01); *H04L 1/1812* (2013.01); *H04L 5/14* (2013.01)

(58) Field of Classification Search
None
See application file for complete search history.

(56) References Cited

U.S. PATENT DOCUMENTS 10,447,460 B2 * 10/2019 Lee ................ H04L 1/1854
2013/0250772 A1    9/2013 Yin
(Continued)

FOREIGN PATENT DOCUMENTS

CN    104767595 A    7/2015
CN    105323857 A    2/2016
(Continued)

OTHER PUBLICATIONS

JPOA issued in Application No. 2021-521790, dated Dec. 9, 2022, with English translation, (4p).
(Continued)

*Primary Examiner* — Otis L Thompson, Jr.
(74) *Attorney, Agent, or Firm* — Arch & Lake LLP (57) ABSTRACT

A method and apparatus for hybrid automatic repeat request (HARQ) feedback is provided. The method includes: determining at least one target HARQ result corresponding to at least one target PDSCH, wherein the at least one target PDSCH is from all PDSCHs scheduled by a current PDCCH, HARQ results corresponding to the at least one target PDSCH are to be fed back through a current subframe; determining a target PUCCH and a combined HARQ result in at least one candidate PUCCH according to the at least one target HARQ result, wherein corresponding target PUCCH resource of the target PUCCH is configured to carry the combined HARQ result, and the combined HARQ result and the target PUCCH resource are configured to identify the at least one target HARQ result; and carrying the combined HARQ result through the target PUCCH resource, and sending the target PUCCH to a base station.

20 Claims, 5 Drawing Sheets (56) References Cited

U.S. PATENT DOCUMENTS

| | | | |
|---|---|---|---|
| 2015/0156763 A1* | 6/2015 | Seo ................... | H04L 5/1469 |
| | | | 370/329 |
| 2016/0128089 A1 | 5/2016 | Seo et al. | |
| 2016/0242169 A1* | 8/2016 | Park .................. | H04L 1/1812 |
| 2016/0337089 A1 | 11/2016 | Chen et al. | |
| 2017/0245265 A1 | 8/2017 | Hwang et al. | |
| 2018/0019842 A1* | 1/2018 | Fu .................... | H04W 72/0446 |
| 2018/0054280 A1* | 2/2018 | Fu .................... | H04L 1/1671 |
| 2018/0097606 A1* | 4/2018 | Toledano ........... | H04L 1/1854 |
| 2018/0255542 A1 | 9/2018 | Seo et al. | |
| 2019/0363842 A1* | 11/2019 | Fu .................... | H04L 1/1671 |
| 2020/0059330 A1* | 2/2020 | Wong ................. | H04L 1/1822 |
| 2020/0245364 A1* | 7/2020 | Kim ................... | H04W 74/004 |

FOREIGN PATENT DOCUMENTS

| | | |
|---|---|---|
| CN | 107113137 A | 8/2017 |
| JP | 2013540387 A | 10/2013 |
| JP | 2015527781 A | 9/2015 |
| WO | 2016182394 A1 | 11/2016 |

OTHER PUBLICATIONS

Office Action of Japanese Application No. 2021-521790 dated May 20, 2022 with English translation, (7p).
Extended European Search Report issued to European Application No. 18929466.3 dated Jul. 21, 2021, (11p).
International Search Report to PCT/CN2018/099473 dated Apr. 28, 2019 with English translation, (4p).

* cited by examiner

HYBRID AUTOMATIC REPEAT REQUEST (HARQ) FEEDBACK METHOD AND APPARATUS

CROSS-REFERENCE TO RELATED APPLICATION

This application is the U.S. national phase application of International Application No. PCT/CN2018/099473, filed on Aug. 8, 2018, the entire contents of which are incorporated herein by reference for all purposes.

TECHNICAL FIELD

The present disclosure relates to a field of communication technology, and more particularly, to a method and an apparatus for hybrid automatic repeat request (HARQ) feedback.

BACKGROUND

As the Internet of Things (IoT) has flourished in recent years, it brings a lot of convenience to human life and work. The machine type communication (MTC) technology is a typical representative of cellular IoT technology.

The MTC system may be divided into two kinds of systems, a time division duplexing (TDD) MTC system and a frequency division duplexing (FDD) MTC system. In the TDD MTC system, when the physical downlink shared channel (PDSCH) scheduled by the TDD MTC is not configured for repeated transmission, the physical uplink control channel (PUCCH) format 1b with channel selection may be used for hybrid automatic repeat request (HARQ) feedback.

The usage of PUCCH format 1b with channel selection in the TDD MTC is similar to that in the traditional TDD long term evolution (LTE), the principle of which is to jointly utilize the content carried by the PUCCH format 1b and the selection of PUCCH transmission resources so as to indicate the HARQ feedback state.

However, since a plurality of PDSCHs are scheduled by one PDCCH and only one possible PUCCH resource may be derived from one PDCCH at this time, the selection of PUCCH resource cannot be performed. In addition, since a plurality of PDSCHs are scheduled by one PDCCH, it may not occur that a certain HARQ feedback state is a DTX state. In other words, the HARQ feedback mode in the TDD MTC system needs to be optimized.

SUMMARY

According to a first aspect of embodiments of the present disclosure, a method for hybrid automatic repeat request (HARQ) feedback is provided. The method is applied to a machine type communication (MTC) device and includes: determining at least one target HARQ result corresponding to at least one target physical downlink shared channel (PDSCH), wherein the at least one target PDSCH is at least one PDSCH from all PDSCHs scheduled by a current physical downlink control channel (PDCCH), HARQ results corresponding to the at least one target PDSCH are to be fed back through a current sub-frame; determining a target PUCCH and a combined HARQ result in at least one candidate physical uplink control channel (PUCCH) according to the at least one target HARQ result, wherein corresponding target PUCCH resource of the target PUCCH is configured to carry the combined HARQ result, and the combined HARQ result and the target PUCCH resource are configured to identify the at least one target HARQ result; and carrying the combined HARQ result through the target PUCCH resource, and sending the target PUCCH to a base station.

According to a second aspect of embodiments of the present disclosure, an apparatus for hybrid automatic repeat request (HARQ) feedback is provided. The apparatus is applied to a machine type communication (MTC) device and includes a processor and a memory for storing instructions executable by the processor. The processor is configured to: determine at least one target HARQ result corresponding to at least one target physical downlink shared channel (PDSCH), wherein the at least one target PDSCH is at least one PDSCH from all PDSCHs scheduled by a current physical downlink control channel (PDCCH), HARQ results corresponding to the at least one target PDSCH are to be fed back through a current sub-frame; determine a target PUCCH and a combined HARQ result in at least one candidate physical uplink control channel (PUCCH) according to the at least one target HARQ result, wherein corresponding target PUCCH resource of the target PUCCH is configured to carry the combined HARQ result is configured to carry the combined HARQ result, and the combined HARQ result and the target PUCCH resource are configured to identify the at least one target HARQ result; and carry the combined HARQ result through the target PUCCH resource, and send the target PUCCH to a base station.

According to a third aspect of embodiments of the present disclosure, a computer-readable storage medium having a computer program stored thereon is provided. The computer program is configured to execute a method for hybrid automatic repeat request HARQ feedback. The method includes: determining at least one target HARQ result corresponding to at least one target physical downlink shared channel (PDSCH), wherein the at least one target PDSCH is at least one PDSCH from all PDSCHs scheduled by a current physical downlink control channel (PDCCH), HARQ results corresponding to the at least one target PDSCH are to be fed back through a current sub-frame; determining a target PUCCH and a combined HARQ result in at least one candidate physical uplink control channel (PUCCH) according to the at least one target HARQ result, wherein corresponding target PUCCH resource of the target PUCCH is configured to carry the combined HARQ result, and the combined HARQ result and the target PUCCH resource are configured to identify the at least one target HARQ result; and carrying the combined HARQ result through the target PUCCH resource, and sending the target PUCCH to a base station.

It should be understood that the above general description and the following detailed description are only exemplary and explanatory, without any limitations to the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification.

DETAILED DESCRIPTION

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the present disclosure as detailed in the appended claims.

The terms used in the present disclosure are only aimed to describe specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms such as first, second and third may be used in the present disclosure to describe various information, the information should not be limited to these terms. These terms are only used to distinguish the same type of information from each other. For example, without departing from the scope of the present disclosure, the first information may also be referred to as a second information, and similarly, the second information may also be referred to as a first information. Depending on the context, the word "if" as used herein may be interpreted as "when . . . " or "upon . . . " or "in response to determine . . . ".

Before a method for hybrid automatic repeat request (HARQ) feedback is introduced according to the embodiments of the present disclosure, the HARQ feedback mode is firstly introduced for time division duplexing TDD machine type communication MTC in the related art.

For example, as shown in Table 1, when the HARQ feedback needs to be performed for three scheduling, the PUCCH transmission content may be set and the PUCCH transmission resource may be selected in accordance with Table 1.

TABLE 1

| HARQ results (HARQ-ACK(0), HARQ-ACK(1), HARQ-ACK(2)) | PUCCH resource | transmission content |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | | No transmission |

The first column in Table 1 indicates the demodulated HARQ results for the 3 scheduling, where ACK (ACKnowledgement, correct) and NACK (Negative ACKnowledgment, incorrect) indicate correct and incorrect demodulation to the scheduled PDSCH, respectively. DTX indicates that a receiving end device has not received the PDCCH corresponding to the scheduled PDSCH.

The second column in Table 1 indicates the PUCCH resource selected by the PUCCH format 1b, wherein $n_{PUCCH,0}^{(1)}$, $n_{PUCCH,1}^{(1)}$ and $n_{PUCCH,2}^{(1)}$ indicate the corresponding PUCCH resource derived from 3 scheduling, respectively.

The third column in Table 1 indicates the transmission content carried by the PUCCH format 1b.

For example, when the demodulation results of the 3 scheduling are ACK, ACK and ACK, respectively, the PUCCH format 1b is transmitted by the TDD MTC device in the PUCCH resource derived from the third scheduling according to Table 1, in which the transmission content of PUCCH format 1b is 11. Correspondingly, if the transmission content "11" is detected in the PUCCH resource derived from the third scheduling, the base station considers that the corresponding three scheduling results are ACK, ACK, ACK.

It may be seen from Table 1 that in the related art, three PDCCHs are needed to schedule three PDSCHs respectively. When the HARQ result feedback is performed, although it is possible to feed back the HARQ results corresponding to the three PDSCHs only through one PUCCH resource, a case may occur that one of the three HARQ results is DTX, for example, the three HARQ results are ACK, NACK/DTX, and ACK respectively. That is to say, many cases for the HARQ results are included in Table 1.

In addition, although three PDCCHs are configured to schedule three PDSCHs respectively in the related art, one PUCCH is finally configured to perform the HARQ result feedback.

Therefore, the above HARQ feedback mode needs to be further optimized.

Figure 1:
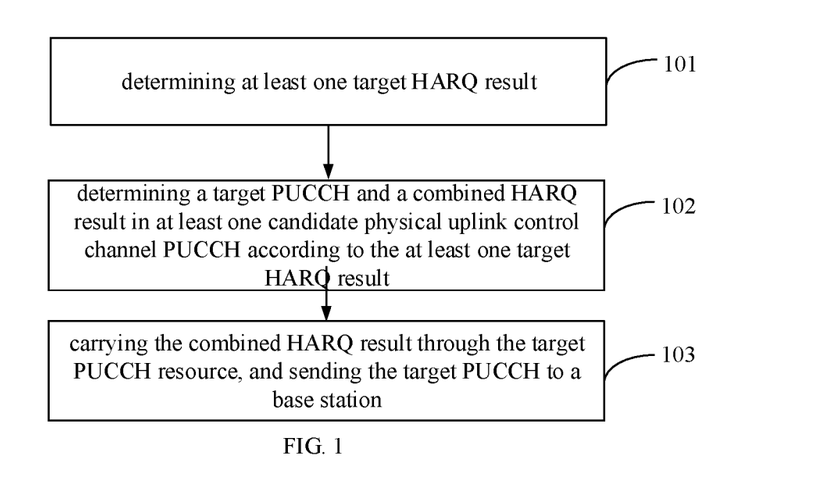
FIG. 1 is a flowchart illustrating a method for hybrid automatic repeat request (HARQ) feedback according to an exemplary embodiment.

The embodiments of the present disclosure provide a method for hybrid automatic repeat request HARQ feedback, which may be applied to a time division duplexing TDD machine type communication MTC device, such as smart meter reader in smart cities, shared bicycles in smart transportation, or temperature and humidity collection device in smart agriculture, etc. Referring to FIG. 1, it is a flowchart illustrating a method for a hybrid automatic repeat request HARQ feedback according to an exemplary embodiment. The method may include the following blocks 101-103.

In block 101, it is determined at least one target HARQ result corresponding to at least one target physical downlink shared channel (PDSCH). The at least one target PDSCH is at least one PDSCH from all PDSCHs scheduled by a current physical downlink control channel (PDCCH). HARQ results corresponding to the at least one target PDSCH are to be fed back through a current sub-frame.

In block 102, it is determined a target PUCCH and a combined HARQ result in at least one candidate physical uplink control channel (PUCCH) according to the at least one target HARQ result. Corresponding target PUCCH resource of the target PUCCH is configured to carry the combined HARQ result, and the combined HARQ result and the target PUCCH resource are configured to identify the at least one target HARQ result. For example, the combined HARQ result and the target PUCCH resource may specify or characterize a plurality of target HARQ results.

In block 103, the combined HARQ result is carried through the target PUCCH resource, and the target PUCCH is sent to a base station.

In the above embodiment, the HARQ results corresponding to all PDSCHs scheduled by the current PDCCH may be fed back through different sub-frames in the TDD MTC system, achieving the purpose of feeding back the HARQ results for the scheduled PDSCH by selecting at least one target PUCCH corresponding to one PDCCH.

Regarding the above-described block 101, in the TDD MTC system, a plurality of consecutive PDSCHs may be scheduled by the current PDCCH at the same time, and the HARQ results corresponding to all PDSCHs scheduled by the current PDCCH may be fed back through at least one sub-frame. The sub-frame through which the HARQ results corresponding to all PDSCHs scheduled by the current PDCCH are fed back is related to the frame format of the TDD system and an uplink sub-frame for transmitting the HARQ feedback. The corresponding relationship is shown in Table 2.

TABLE 2

| uplink/downlink configuration | sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 2 lists a set of downlink sub-frame information that each uplink sub-frame configured by each uplink/downlink is responsible to feed back. Specifically, if the downlink sub-frame information corresponding to each uplink sub-frame n in Table 2 is defined as k, a set of downlink sub-frames that the uplink sub-frame n is responsible to feed back is n–k.

It is taken as an example that the frame format of the TDD MTC system is 1 (that is, the uplink/downlink configuration is 1) and three PDSCHs are scheduled by the current PDCCH. If three PDSCHs are scheduled by the current PDCCH, it may be determined according to Table 2 that the sub-frame 2 is responsible to feed back the HARQ corresponding to the PDSCH carried by the (2-6)th or (2-7)th sub-frame when the uplink/downlink configuration is 1. That is, the sub-frame 2 is responsible to feed back the HARQ corresponding to the PDSCH carried by the sub-frame 5 and sub-frame 6 in a previous radio frame. The sub-frame 3 is responsible to feed back the HARQ corresponding to the PDSCH carried by the (3-4)th sub-frame. That is, the sub-frame 3 is responsible to feed back the HARQ corresponding to the PDSCH carried by the sub-frame 9 in the previous radio frame.

In other words, if a plurality of PDSCHs scheduled by one PDCCH are transmitted through the sub-frame 5, the sub-frame 6, and the sub-frame 9, the HARQ corresponding to the PDSCH carried by the sub-frame 5 and sub-frame 6 is fed back in the sub-frame 2 of the next radio frame. The HARQ corresponding to the PDSCH carried by the sub-frame 9 is fed back in sub-frame 3 of the next radio frame.

In this step, the TDD MTC device may determine at least one target HARQ result in accordance with the related art, where the at least one target HARQ result is the HARQ result corresponding to at least one target PDSCH, and the at least one target PDSCH is at least one PDSCH where HARQ results need to be fed back through current sub-frame from all PDSCHs scheduled by the current PDCCH.

In the embodiments of the present disclosure, it should be noted that since the at least one target PDSCH is scheduled by the current PDCCH, it may be determined whether the target HARQ result corresponding to each of the at least one target PDSCH is correct or incorrect, or it may be determined that the target HARQ result corresponding to each of the at least one target PDSCH is that the current PDCCH is not received. However, it will not appear that a situation where a certain HARQ result is that the current PDCCH is not received by scheduling a plurality of PDSCHs through a plurality of PDCCHs in the related art. Therefore, the above Table 1 may be optimized. The optimization of Table 1 will be further explained hereafter.

In this step, the TDD MTC device may determine that at least one target HARQ result may be ACK or NACK, or all may be DTX.

For the above-described in block 102, the TDD MTC device may first determine a number of candidate PUCCHs based on all possible target PUCCH resources in a preset mapping relationship between a plurality of target HARQ results, target PUCCH resources and group HARQ feedbacks.

For example, if the number of all possible target PUCCH resources in the preset mapping relationship is 1, the number of candidate PUCCH resources is 1; if the number of all possible target PUCCH resources in the preset mapping relationship is multiple, the number of candidate PUCCH resources is accordingly multiple.

After determining the candidate PUCCH, the TDD MTC device may determine a target PUCCH and a combined HARQ result in at least one candidate PUCCH according to a preset mapping relationship between a plurality of target HARQ results, target PUCCH resources and combined HARQ results.

For example, the preset mapping relationship between a plurality of target HARQ results, target PUCCH resources and group HARQ feedbacks is shown in Table 3.

TABLE 3

| combined HARQ results | target PUCCH resources | a plurality of target HARQ results characterized |
|---|---|---|
| X (X may be 0 or 1) | n_PUCCH 1<br>n_PUCCH 2 | X0<br>X1 |

After the TDD MTC device determines a plurality of target HARQ results according to the block 101 and determines the candidate PUCCHs in this step, it can determine the target PUCCH resource and the combined HARQ result at the same time according to Table 3.

Assuming that the plurality of target HARQ results previously determined are 1, 0, and index values of the candidate PUCCH resources corresponding to the candidate PUCCH are n_PUCCH 1 and n_PUCCH 2, it may be then determined according to Table 3 that the combined HARQ result is 1 if the value of X is 1 and the index value of the target PUCCH resource is n_PUCCH 1.

Further, the TDD MTC device may determine the corresponding target PUCCH according to the index value of the target PUCCH resource, and determine the PUCCH with an index value of n_PUCCH 1 as the target PUCCH.

For the above-described block 103, the combined HARQ result may be carried by the TDD MTC device through the target PUCCH resource in the current sub-frame in accordance with the related art, and the target PUCCH is sent to a base station.

In an embodiment, the TDD MTC device may determine the candidate PUCCH in any of the following manners.

In the first manner, if the number of at least one target PDSCH is 1, the PUCCH indicated by a candidate index value is determined as the candidate PUCCH.

Figure 2:
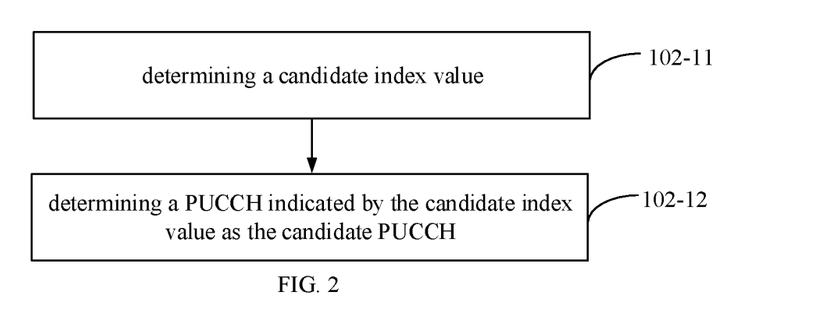
FIG. 2 is a flowchart illustrating another method for hybrid automatic repeat request (HARQ) feedback according to an exemplary embodiment.

In this manner, the number of PDSCHs for which HARQ results need to be fed back through the current sub-frame is 1, which may refer to the illustration of FIG. 2. FIG. 2 is a flowchart illustrating another method for hybrid automatic repeat request HARQ feedback according to the embodiment illustrated in FIG. 1. The process of determining a candidate PUCCH may include the following blocks 102-11 and 102-12.

In block 102-11, a candidate index value is determined. The candidate index value is a resource index value corresponding to the candidate PUCCH.

In this step, the candidate index may be determined according to a first function value of a first preset function, a value corresponding to a target starting position, a second function value of a second preset function, and a first target offset value. Optionally, a sum of the first function value, the value corresponding to the target starting position, the second function value and the first target offset may be calculated to obtain the candidate index value.

Of course, the candidate index value may be calculated in other calculation methods according to the first function value, the value corresponding to the target starting position, the second function value, and the first target offset, which is not limited in the present disclosure.

The first preset function is a preset function corresponding to a target control channel element (CCE) index value, in which the target CCE index value is a minimum CCE index value corresponding to the current PDCCH. The target starting position is a starting position of the resource corresponding to the PUCCH channel configured to carry the HARQ results. The second preset function is a preset function corresponding to a first target value and a second target value, in which the first target value is a value corresponding to sub-frame configuration of the TDD MTC system and a position of the current sub-frame, and the second target value is a number of CCEs included in a physical resource block carrying the current PDCCH. The first target offset is an offset of PUCCH resource carried by the current PDCCH for the HARQ result feedback.

Specifically, the candidate index value may be determined according to the following equation 1 or equation 2.

If a distributed PDCCH transmission mode is adopted, the candidate index value may be calculated by equation 1:

$$n_{PUCCH}^{(1,p_0)} = n_{ECCE} + \sum_{i1=0}^{m-1} N_{ECCE,n-k_{i1}} + \Delta_{ARO} + N_{PUCCH} \quad \text{equation 1}$$

If a centralized PDCCH transmission mode is adopted, the candidate index value may be calculated by equation 2:

$$n_{PUCCH}^{(1,p_0)} = \left\lfloor \frac{n_{ECCE}}{N_{RB}^{ECCE}} \right\rfloor \cdot N_{RB}^{ECCE} + \sum_{i1=0}^{m-1} N_{ECCE,q,n-k_{i1}} + n' + \Delta_{ARO} + N_{PUCCH,q}^{(m1)} \quad \text{equation 2}$$

where the target CCE index value $n_{CCE}$ is the lowest CCE index occupied by the PDCCH corresponding to the current scheduling, and the value $N_{PUCCH}$ corresponding to the target starting position is a starting position of the PUCCH resource configured by high-level signaling such as RRC signaling, $\Delta ARO$ is a first target offset, $N_{ECCE, n-k_{il}}$ indicates a total number of enhanced control channel elements ECCEs included in a set of PDCCH physical resource blocks of the sub-frame $n-k_{il}$ in which n indicates a serial number of an uplink sub-frame that feeds back the HARQ and a value of $k_{il}$ corresponding to each uplink sub-frame is shown in Table 2.

i1 in $k_{il}$ indicates a serial number of the value $k_{il}$ located in the corresponding set. For example, in case that the uplink or downlink configuration is 1, the $k_{il}$ value corresponding to the uplink sub-frame 2 is 7, 6 respectively. Then for $k_{il}$=7, the i1 value is 0, and for $k_{il}$=6, the i1 value is 1.

In addition, the value of m in the above equation 1 and equation 2 is a serial number of the $k_{il}$ value corresponding to a downlink sub-frame where a certain PDSCH is located. Finally, $\Delta_{ARO}$ is an offset of one PUCCH resource indicated in a DCI. In particular, in the centralized PDCCH transmission, $N_{RB}^{ECCE}$ in the PUCCH resource derivation equation is a number of ECCEs contained in one resource block RB, and n' is a parameter related to antenna ports for transmitting the PDCCH, which is determined by equation 3:

$$n'=n_{ECCE} \bmod N_{ECCE}^{RB}+n_{RNTI} \bmod \min(N_{ECCE}^{MPDCCH}, N_{ECCE}^{RB}) \quad \text{equation 3}$$

where $n_{RNTI}$ is an identifier configured by the base station for a user, and $N_{ECCE}^{MPDCCH}$ indicates a total number of ECCEs occupied by the PDCCH transmission.

In this step, the candidate index value may be determined by the TDD MTC device according to the equation 1 or equation 2.

In block 102-12, a PUCCH indicated by the candidate index value is determined as the candidate PUCCH.

In this step, the PUCCH indicated by the candidate index value is determined by the TDD MTC device as the candidate PUCCH.

In the above-described embodiment, it is preset that a mapping relationship between a plurality of target HARQ results, target PUCCH resources and group HARQ feedbacks, if a number of possible target PUCCH resources is 1, one candidate PUCCH needs to be derived. Then, the candidate index value may be firstly determined by the TDD MTC device, a PUCCH indicated by the candidate index value is determined as the candidate PUCCH, and a target PUCCH may be subsequently determined in at least one candidate physical uplink control channel PUCCH, achieving the purpose of feeding back the HARQ results for the scheduled PDSCH by selecting at least one target PUCCH corresponding to one PDCCH.

In the second manner, a preset mapping relationship between a plurality of target HARQ results, target PUCCH resources and group HARQ feedbacks is shown in Table 3. If a number of possible target PUCCH resources in the mapping relationship is multiple, a plurality of candidate PUCCHs need to be derived at this time. Then, a first index value and a second index value are respectively determined, and the PDCCH indicated by the first index value and the second index value is determined as the candidate PUCCH.

Figure 3:
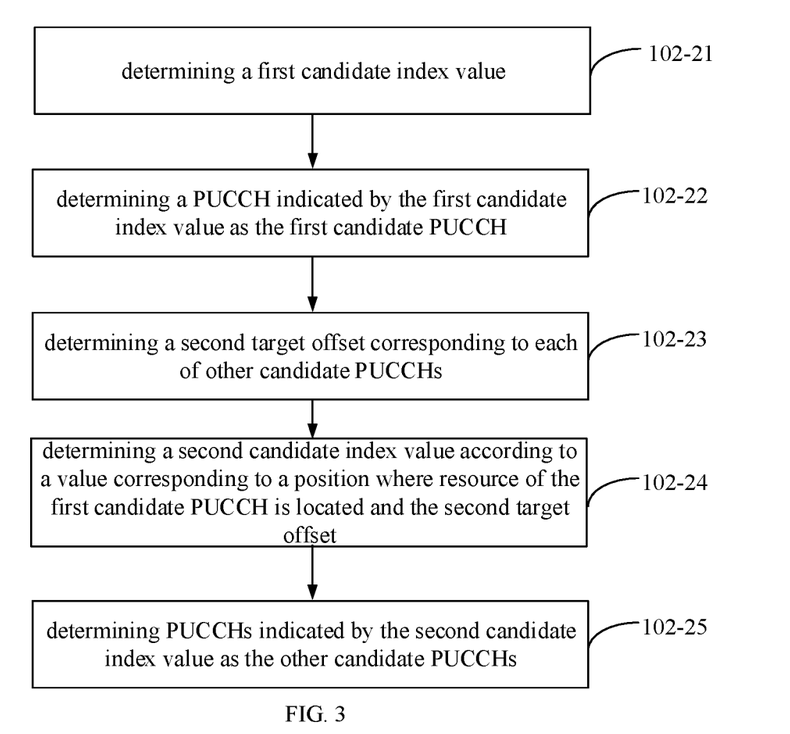
FIG. 3 is a flowchart illustrating another method for hybrid automatic repeat request (HARQ) feedback according to an exemplary embodiment.

In this manner, referring to FIG. 3, it is a flowchart illustrating another method for hybrid automatic repeat request HARQ feedback according to an exemplary embodiment illustrated in FIG. 1. The process of determining a candidate PUCCH may include the following blocks 102-21 to 102-25.

In block 102-21, a first candidate index value is determined. The first candidate index value is a resource index value corresponding to a first candidate PUCCH in a plurality of candidate PUCCHs.

In this step, determining the first candidate index value may be the same as determining the candidate index value in the above-described block 102-11, which will not be repeated herein.

In block 102-22, a PUCCH indicated by the first candidate index value is determined as a first candidate PUCCH.

In this step, the PUCCH indicated by the first candidate index value may be also determined as a first candidate PUCCH by the TDD MTC device In block 102-23, a second target offset corresponding to each of other candidate PUCCHs is determined. The other candidate PUCCHs are candidate PUCCHs other than the first candidate PUCCH, and the second target offset is a resource offset of a current other candidate PUCCH relative to the first candidate PUCCH.

In this step, the second target offset may be sent to the TDD MTC device by the base station through a preset signaling such as a high-level RRC signaling or physical layer DCI signaling. Optionally, the second target offset configured by the base station may be the same, for example, each second target offset is offset. Or the second target offset may be different, for example, a set of offsets $\{X1, X2, \ldots, Xi\}$ is configured by the base station through the preset signaling, each of which corresponds to a different second target offset in order.

Or a preset resource offset may be directly determined as the second target offset by the TDD MTC device.

In block 102-24, a second candidate index value is determined according to a value corresponding to a position where resources in the first candidate PUCCH are located and the second target offset.

In this step, a sum of the value corresponding to the position where resources in the first candidate PUCCH are located and the second target offset may be directly determined as the second candidate index value by the TDD MTC device Optionally, if the second target offset is configured by the base station to the TDD MTC device through a preset signaling such as an RRC signaling or a DCI signaling, or the preset resource offset is directly determined as the second target offset, the second candidate index value $n_{PUCCH,i}$ may be calculated by equation 4:

$$n_{PUCCH,i} = n_{PUCCH,0} + i * \text{offset} \quad \text{equation 4}$$

where $i=1, 2, 3, 4 \ldots$, $n_{PUCCH,0}$ is the value corresponding to the position where resources in the first candidate PUCCH are located, and offset is the second target offset.

If a set of offsets $\{X1, X2, \ldots, Xi\}$ is configured by the base station through a preset signaling such as an RRC signaling or a DCI signaling, each of which corresponds to a different second target offset in order, the second candidate index value $n_{PUCCH,i}$ may be calculated by the equation 5:

$$n_{PUCCH,i} = n_{PUCCH,0} + X_i \quad \text{equation 5}$$

where $i=1, 2, 3, 4 \ldots$, $n_{PUCCH,0}$ is the value corresponding to the position where resources in the first candidate PUCCH are located, and Xi is the second target offset.

In block 102-25, PUCCHs indicated by the second candidate index value are determined as the other candidate PUCCHs.

In this step, after the second candidate index value is calculated using the equation 4 or equation 5 by the TDD MTC device, the PUCCH indicated by each second candidate index value may be directly determined as the other candidate PUCCH.

In the above-described embodiment, a preset mapping relationship between a plurality of target HARQ results, target PUCCH resources and group HARQ feedbacks is shown in Table 3. If a number of possible target PUCCH resources in the mapping relationship is multiple, a plurality of candidate PUCCHs need to be derived at this time. Then, a first index value may be firstly determined by the TDD MTC device, and the PUCCH indicated by the first candidate index value is determined as the first candidate PUCCH. Further, a second target offset corresponding to each of the other candidate PUCCHs is determined, a second candidate index value is then determined according to the value corresponding to the position where resources in the first candidate PUCCH are located and the second target offset, and a PUCCH indicated by the second candidate index value is determined as the other candidate PUCCH by the TDD MTC device. Through the above process, the TDD MTC device may quickly determine a plurality of candidate PUCCHs, and may subsequently determine a target PUCCH in at least one candidate physical uplink control channel PUCCH, achieving the purpose of feeding back the HARQ results for the scheduled PDSCH by selecting at least one target PUCCH corresponding to one PDCCH.

In the third manner, a preset mapping relationship between a plurality of target HARQ results, target PUCCH resources and group HARQ feedbacks is shown in Table 3. If a number of possible target PUCCH resources in the mapping relationship is multiple, a plurality of candidate PUCCHs need to be derived at this time. At this time, the base station configures the plurality of candidate PUCCHs.

Figure 4:
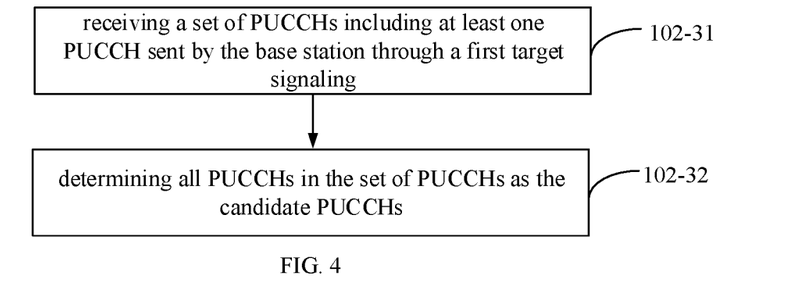
FIG. 4 is a flowchart illustrating another method for hybrid automatic repeat request (HARQ) feedback according to an exemplary embodiment.

In this manner, referring to FIG. 4, it is a flowchart illustrating another method for hybrid automatic repeat request HARQ feedback according to an exemplary embodiment illustrated in FIG. 1. The process of determining a candidate PUCCH may include the following blocks 102-31 and 102-32.

In block 102-31, it is received that a set of PUCCHs including at least one PUCCH sent by the base station through a first target signaling.

In this step, a set of PUCCHs including at least one PUCCH may be configured by the base station for the TDD MTC device through a first target signaling such as an RRC signaling, for example $\{n_{PUCCH,0}, n_{PUCCH,1}, \ldots, n_{PUCCH,i}\}$.

In block 102-32, all PUCCHs in the set of PUCCHs are determined as the candidate PUCCHs.

In this step, all PUCCHs in the set of PUCCHs may be determined as candidate PUCCHs by the TDD MTC device.

In the above-described embodiment, a preset mapping relationship between a plurality of target HARQ results, target PUCCH resources and group HARQ feedbacks is shown in Table 3. If a number of possible target PUCCH resources in the mapping relationship is multiple, a plurality of candidate PUCCHs need to be derived at this time. Then a set of PUCCHs including at least one PUCCH sent by the base station through the first target signaling may be received by the TDD MTC device. All PUCCHs in the set of PUCCHs may be determined as the candidate PUCCHs. It is also possible to achieve the purpose of feeding back the HARQ results for the scheduled PDSCH by selecting at least one target PUCCH corresponding to one PDCCH.

In an embodiment, the target HARQ result corresponding to each target PDSCH is determined by the TDD MTC device. The target HARQ result may be ACK or NACK, or all target HARQ results are that the current PDCCH is not received.

Further, the TDD MTC device determines that it is necessary to determine a number of candidate PUCCH resources through a number of all possible target PUCCH resources in the preset mapping relationship between a plurality of target HARQ results, target PUCCH resource and group HARQ feedbacks, a number of candidate PUCCHs is the same as the number of all possible target PUCCH resources.

If the number of all possible target PUCCH resources is 1, the number of candidate PUCCHs is also 1. The candidate index value may be calculated by the equation 1 or equation 2, and the PUCCH corresponding to the candidate index value is determined as the candidate PUCCH.

If the number of all possible target PUCCH resources is multiple, a first candidate index value may be firstly determined, and determining the first candidate index value is the same as determining the candidate index value, which will not be repeated herein. The PUCCH corresponding to the first candidate index value is determined as the first candidate PUCCH by the TDD MTC device.

Then, a second target offset corresponding to each of the other candidate PUCCHs is determined. The second target offset may be sent to the TDD MTC device by the base station through a preset signaling such as a high-layer RRC signaling or a physical layer DCI signaling; or a preset resource offset is directly determined as the second target offset. A sum of the value corresponding to the position where resources in the first candidate PUCCH are located and the second target offset is determined as the second candidate index value by the TDD MTC device, so that a PUCCH indicated by the second candidate index value is determined as the other candidate PUCCH.

If the number of all possible target PUCCH resources is multiple, a set of PUCCHs including at least one PUCCH may also be configured by the base station for the TDD MTC device directly through a first target signaling such as an RRC signaling, and all PUCCHs in the set of PUCCHs are determined as the candidate PUCCHs.

In the embodiments of the present disclosure, after the candidate PUCCH is determined by the TDD MTC device in the above manner, the target PUCCH and the combined HARQ result are determined in at least one candidate PUCCH according to the preset mapping relationship between a plurality of target HARQ results, target PUCCH resources, and combined HARQ results. The manner of determining is the same as that of determining the target PUCCH and the combined HARQ result in block 102, which will not be repeated herein.

After the target PUCCH and the combined HARQ result are determined by the TDD MTC device, the combined HARQ result may be directly carried through the target PUCCH resource in the current sub-frame, and the target PUCCH is sent to the base station.

In the above embodiment, the HARQ results corresponding to all PDSCHs scheduled by the current PDCCH may be fed back through different sub-frames in the TDD MTC system, achieving the purpose of feeding back the HARQ results for the scheduled PDSCH by selecting at least one target PUCCH corresponding to one PDCCH.

In an embodiment, since at least one target PDSCH is scheduled by the current PDCCH it may be determined whether the target HARQ result corresponding to each of the at least one target PDSCH is correct or incorrect, or it may be determined that the target HARQ result corresponding to each of the at least one target PDSCH is that the current PDCCH is not received. However, it will not appear that a situation where a certain HARQ result is that the current PDCCH is not received by scheduling a plurality of PDSCHs through a plurality of PDCCHs in the related art. Therefore, the above Table 1 may be optimized.

Examples are described as follows:

Example 1: 2 PDSCHs are scheduled by the current PDCCH, and a mapping relationship between target HARQ feedbacks, target PUCCH resources and group feedback results is preset as shown in Table 4. At this time, there is only one candidate PUCCH. The HARQ results corresponding to the 2 PDSCHs need to be fed back by the content carried by the candidate PUCCH, that is, the HARQ results corresponding to the 2 PDSCHs are fed back as a combined HARQ result as the candidate PUCCH is determined as the target PUCCH at this time.

TABLE 4

| HARQ results (HARQ-ACK(0), HARQ-ACK(1)) | target PUCCH resources | transmission content (b(0), b(1)) |
|---|---|---|
| ACK, ACK | $n_{PUCCH,0}^{(1)}$ | 1, 1 |
| ACK, NACK | $n_{PUCCH,0}^{(1)}$ | 1, 0 |
| NACK, ACK | $n_{PUCCH,0}^{(1)}$ | 0, 1 |
| NACK, NACK | $n_{PUCCH,0}^{(1)}$ | 0, 0 |
| DTX, DTX | | No transmission |

It may be seen from Table 4 that since the two PDSCHs are scheduled by the current PDCCH, it will not appear in Table 4 that the case of DTX, ACK or the case of NACK, DTX. That is, it will not appear that the HARQ result corresponding to a certain PDSCH is DTX, and the HARQ result may be only ACK or NACK, or all the HARQ results are DTX. The above table in the related art is optimized.

2 PDSCHs are scheduled by the current PDCCH, and a mapping relationship between target HARQ feedbacks, target PUCCH resources and group feedback results is preset as shown in Table 4. At this time, there are 2 candidate PUCCHs. The HARQ result corresponding to one PDSCH needs to be fed back through the content carried by the target PUCCH (that is, the combined HARQ result) and the HARQ result corresponding to the other PDSCH needs to be fed back through the target PUCCH resource.

TABLE 5

| HARQ results (HARQ-ACK(0), HARQ-ACK(1)) | target PUCCH resources | transmission content (b(0)) |
|---|---|---|
| ACK, ACK | $n_{PUCCH,0}^{(1)}$ | 1 |
| ACK, NACK | $n_{PUCCH,1}^{(1)}$ | 1 |
| NACK, ACK | $n_{PUCCH,0}^{(1)}$ | 0 |
| NACK, NACK | $n_{PUCCH,1}^{(1)}$ | 0 |
| DTX, DTX | | No transmission |

It may also be seen from Table 5 that since both PDSCHs are scheduled by the current PDCCH, it will not appear in Table 5 that the case of DTX, ACK (or NACK), or the case of NACK (or ACK), DTX. That is, it will not appear that the HARQ result corresponding to a certain PDSCH is DTX, and the HARQ result may be only ACK or NACK, or all the HARQ results are DTX. The above table in the related art is optimized.

2 PDSCHs are scheduled by the current PDCCH, and a mapping relationship between target HARQ feedbacks, target PUCCH resources and group feedback results is preset as shown in Table 6. At this time, there are two candidate PUCCHs. The HARQ results corresponding to the 2 PDSCHs need to be fed back through the content carried by the target PUCCH (that is, the combined HARQ result).

TABLE 6

| HARQ results (HARQ-ACK(0), HARQ-ACK(1)) | target PUCCH resources | transmission content (b(0), b(1)) |
|---|---|---|
| ACK, ACK | $n_{PUCCH,1}^{(1)}$ | 1, 1 |
| ACK, NACK | $n_{PUCCH,0}^{(1)}$ | 0, 1 |
| NACK, ACK | $n_{PUCCH,1}^{(1)}$ | 0, 0 |
| NACK, NACK | $n_{PUCCH,1}^{(1)}$ | 1, 0 |
| kept for future use | $n_{PUCCH,0}^{(1)}$ | 1, 1 |
|  | $n_{PUCCH,1}^{(1)}$ | 0, 1 |
|  | $n_{PUCCH,0}^{(1)}$ | 0, 0 |
|  | $n_{PUCCH,0}^{(1)}$ | 1, 0 |
| DTX, DTX | | No transmission |

It may also be seen from Table 6 that since both PDSCHs are scheduled by the current PDCCH, it will not appear in Table 6 that the case of DTX, ACK (or NACK), or the case of NACK (or ACK), DTX. That is, it will not appear that the HARQ result corresponding to a certain PDSCH is DTX, and the HARQ result may be only ACK or NACK, or all the HARQ results are DTX. The above table in the related art is optimized.

Example 2: 3 PDSCHs are scheduled by the current PDCCH, and a mapping relationship between target HARQ feedbacks, target PUCCH resources and group feedback results is preset as shown in Table 7. At this time, there are 2 candidate PUCCHs. The HARQ results corresponding to 2 PDSCHs need to be fed back through the target PUCCH (that is, the combined HARQ result) and the HARQ result corresponding to another PDSCH needs to be fed back through the target PUCCH resource.

TABLE 7

| HARQ results (HARQ-ACK(0), HARQ-ACK(1), HARQ-ACK(2)) | target PUCCH resources | transmission content (b(0), b(1)) |
|---|---|---|
| ACK, ACK, ACK | $n_{PUCCH,0}^{(1)}$ | 1, 1 |
| ACK, ACK, NACK | $n_{PUCCH,0}^{(1)}$ | 1, 0 |
| ACK, NACK, ACK | $n_{PUCCH,0}^{(1)}$ | 0, 1 |
| ACK, NACK, NACK | $n_{PUCCH,0}^{(1)}$ | 0, 0 |
| NACK, ACK, ACK | $n_{PUCCH,1}^{(1)}$ | 1, 1 |
| NACK, ACK, NACK | $n_{PUCCH,1}^{(1)}$ | 1, 0 |
| NACK, NACK, ACK | $n_{PUCCH,1}^{(1)}$ | 0, 1 |
| NACK, NACK, NACK | $n_{PUCCH,1}^{(1)}$ | 0, 0 |
| DTX, DTX, DTX | | No transmission |

It may also be seen from Table 7 that since all the 3 PDSCHs are scheduled by the current PDCCH, it will not appear in Table 7 that the HARQ result corresponding to a certain PDSCH is DTX, and the HARQ result may be only ACK or NACK, or all the HARQ results are DTX. The above table in the related art is optimized.

3 PDSCHs are scheduled by the current PDCCH, and a mapping relationship between target HARQ feedbacks, target PUCCH resources and group feedback results is preset as shown in Table 8. At this time, there are 3 candidate PUCCHs. The target HARQ feedback results are jointly characterized by the selection of target PUCCH resources and the group feedback results.

TABLE 8

| HARQ results (HARQ-ACK(0), HARQ-ACK(1), HARQ-ACK(2)) | target PUCCH resources | transmission content (b(0), b(1)) |
|---|---|---|
| ACK, ACK, ACK | $n_{PUCCH,0}^{(1)}$ | 1, 1 |
| ACK, ACK, NACK | $n_{PUCCH,0}^{(1)}$ | 1, 0 |
| ACK, NACK, ACK | $n_{PUCCH,0}^{(1)}$ | 0, 1 |
| ACK, NACK, NACK | $n_{PUCCH,1}^{(1)}$ | 1, 1 |
| NACK, ACK, ACK | $n_{PUCCH,1}^{(1)}$ | 1, 0 |
| NACK, ACK, NACK | $n_{PUCCH,1}^{(1)}$ | 0, 1 |
| NACK, NACK, ACK | $n_{PUCCH,2}^{(1)}$ | 1, 1 |
| NACK, NACK, NACK | $n_{PUCCH,2}^{(1)}$ | 1, 0 |
| kept for future use | $n_{PUCCH,0}^{(1)}$ | 0, 0 |
|  | $n_{PUCCH,1}^{(1)}$ | 0, 0 |
|  | $n_{PUCCH,2}^{(1)}$ | 0, 0 |
|  | $n_{PUCCH,2}^{(1)}$ | 0, 1 |
| DTX, DTX, DTX | | No transmission |

It may also be seen from Table 8 that since all the 3 PDSCHs are scheduled by the current PDCCH, it will not appear in Table 8 that the HARQ result corresponding to a certain PDSCH is DTX, and the HARQ result may be only ACK or NACK, or all the HARQ results are DTX. The above table in the related art is optimized.

3 PDSCHs are scheduled by the current PDCCH, and a mapping relationship between target HARQ feedbacks, target PUCCH resources and group feedback results is preset as shown in Table 9. At this time, there are 4 candidate PUCCHs. The HARQ result corresponding to 1 PDSCH needs to be fed back through the content carried by the target PUCCH (that is, the combined HARQ result), and the HARQ results corresponding to the other 2 PDSCHs need to be fed back through the target PUCCH resource.

TABLE 9

| HARQ results (HARQ-ACK(0), HARQ-ACK(1), HARQ-ACK(2)) | target PUCCH resources | transmission content (b(0)) |
|---|---|---|
| ACK, ACK, ACK | $n_{PUCCH,0}^{(1)}$ | 1 |
| ACK, ACK, NACK | $n_{PUCCH,0}^{(1)}$ | 0 |
| ACK, NACK, ACK | $n_{PUCCH,1}^{(1)}$ | 1 |
| ACK, NACK, NACK | $n_{PUCCH,1}^{(1)}$ | 0 |
| NACK, ACK, ACK | $n_{PUCCH,2}^{(1)}$ | 1 |
| NACK, ACK, NACK | $n_{PUCCH,2}^{(1)}$ | 0 |
| NACK, NACK, ACK | $n_{PUCCH,3}^{(1)}$ | 1 |
| NACK, NACK, NACK | $n_{PUCCH,3}^{(1)}$ | 0 |
| DTX, DTX, DTX | | No transmission |

It may also be seen from Table 9 that since all the 3 PDSCHs are scheduled by the current PDCCH, it will not appear in Table 9 that the HARQ result corresponding to a certain PDSCH is DTX, and the HARQ result may be only ACK or NACK, or all the HARQ results are DTX. The above table in the related art is optimized.

Example 3: 4 PDSCHs are scheduled by the current PDCCH, and a mapping relationship between target HARQ feedbacks, target PUCCH resources and group feedback results is preset as shown in Table 10. If there are 4 candidate PUCCHs, the HARQ results corresponding to 2 PDSCHs need to be fed back through the content carried by the target PUCCH (that is, the combined HARQ result), and the HARQ results corresponding to the other 2 PDSCHs need to be fed back through the target PUCCH resource.

TABLE 10

| HARQ results (HARQ-ACK(0), HARQ-ACK(1), HARQ-ACK(2), HARQ-ACK(3)) | target PUCCH resources | transmission content (b(0), b(1)) |
|---|---|---|
| ACK, ACK, ACK, ACK | $n_{PUCCH,0}^{(1)}$ | 1, 1 |
| ACK, ACK, ACK, NACK | $n_{PUCCH,0}^{(1)}$ | 1, 0 |
| ACK, ACK, NACK, ACK | $n_{PUCCH,0}^{(1)}$ | 0, 1 |
| ACK, ACK, NACK, NACK | $n_{PUCCH,0}^{(1)}$ | 0, 0 |
| ACK, NACK, ACK, ACK | $n_{PUCCH,1}^{(1)}$ | 1, 1 |
| ACK, NACK, ACK, NACK | $n_{PUCCH,1}^{(1)}$ | 1, 0 |
| ACK, NACK, NACK, ACK | $n_{PUCCH,1}^{(1)}$ | 0, 1 |
| ACK, NACK, NACK, NACK | $n_{PUCCH,1}^{(1)}$ | 0, 0 |
| NACK, ACK, ACK, ACK | $n_{PUCCH,2}^{(1)}$ | 1, 1 |
| NACK, ACK, ACK, NACK | $n_{PUCCH,2}^{(1)}$ | 1, 0 |
| NACK, ACK, NACK, ACK | $n_{PUCCH,2}^{(1)}$ | 0, 1 |
| NACK, ACK, NACK, NACK | $n_{PUCCH,2}^{(1)}$ | 0, 0 |
| NACK, NACK, ACK, ACK | $n_{PUCCH,3}^{(1)}$ | 1, 1 |
| NACK, NACK, ACK, NACK | $n_{PUCCH,3}^{(1)}$ | 1, 0 |
| NACK, NACK, NACK, ACK | $n_{PUCCH,3}^{(1)}$ | 0, 1 |
| NACK, NACK, NACK, NACK | $n_{PUCCH,3}^{(1)}$ | 0, 0 |
| DTX, DTX, DTX, DTX | | No transmission |

It may also be seen from Table 10 that since all the 4 PDSCHs are scheduled by the current PDCCH, it will not appear in Table 10 that the HARQ result corresponding to a certain PDSCH is DTX, and the HARQ result may be only ACK or NACK, or all the HARQ results are DTX. The above table in the related art is optimized.

In the above-described embodiment, it may be determined according to the at least one target PDSCH scheduled by the current PDCCH whether the at least one target HARQ result that needs to be fed back through the current sub-frame may be correct or incorrect, or it may be determined that at least one target HARQ result may be all that the current PDCCH is not received. In this way, when the HARQ result feedback is performed in the related art, the HARQ result feedback includes correct, incorrect or a case that the current PDCCH is not received since a plurality of PDSCHs are scheduled through a plurality of PDCCHs.

Corresponding to the above-described method embodiments implementing application functions, the present disclosure also provides embodiments of apparatus and corresponding MTC terminals implementing the application functions.

Figure 5:
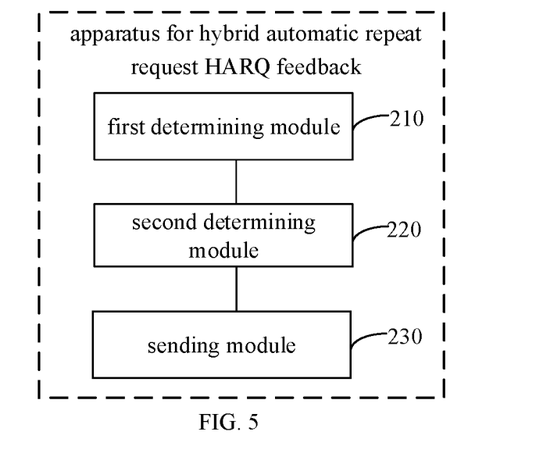
FIG. 5 is a block diagram illustrating an apparatus for hybrid automatic repeat request (HARQ) feedback according to an exemplary embodiment.

Referring to FIG. 5, it is block diagram illustrating an apparatus for hybrid automatic repeat request HARQ feedback according to an exemplary embodiment. The apparatus is applied to a time division duplexing (TDD) machine type communication (MTC) device. The apparatus includes a first determining module 210, a second determining module 220 and a sending module 230.

The first determining module 210 is configured to determine at least one target HARQ result corresponding to at least one target physical downlink shared channel (PDSCH). The at least one target PDSCH is at least one PDSCH from all PDSCHs scheduled by a current physical downlink control channel (PDCCH). HARQ results corresponding to the at least one target PDSCH are to be fed back through a current sub-frame.

The second determining module 220 is configured to determine a target PUCCH and a combined HARQ result in at least one candidate physical uplink control channel (PUCCH) according to the at least one target HARQ result. Corresponding target PUCCH resource of the target PUCCH is configured to carry the combined HARQ result is configured to carry the combined HARQ result, and the combined HARQ result and the target PUCCH resource are configured to characterize or identify a plurality of target HARQ results.

The sending module 230 is configured to carry the combined HARQ result through the target PUCCH resource, and send the target PUCCH to a base station.

Figure 6:
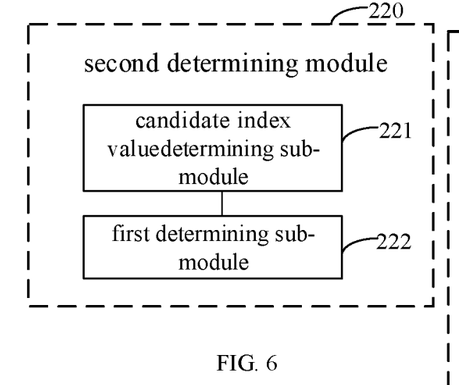
FIG. 6 is a block diagram illustrating another apparatus for hybrid automatic repeat request (HARQ) feedback according to an exemplary embodiment.

Referring to FIG. 6, it is a block diagram illustrating another apparatus for hybrid automatic repeat request HARQ feedback based on the embodiment illustrated in FIG. 5. The second determining module 220 includes a candidate index value determining sub-module 221 and a first determining sub-module 222.

The candidate index value determining sub-module 221 is configured to determine a candidate index value in case that a number of the at least one target PDSCH is 1. The candidate index value is a resource index value corresponding to the candidate PUCCH 1.

The first determining sub-module 222 is configured to determine a PUCCH indicated by the candidate index value as the candidate PUCCH.

Figure 7:
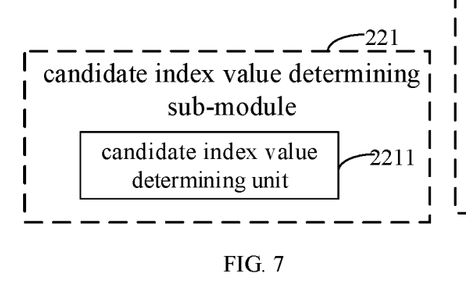
FIG. 7 is a block diagram illustrating another apparatus for hybrid automatic repeat request (HARQ) feedback according to an exemplary embodiment.

Referring to FIG. 7, it is a block diagram illustrating another apparatus for hybrid automatic repeat request HARQ feedback based on the embodiment illustrated in FIG. 6. The candidate index value determining sub-module 221 includes a candidate index value determining unit 2211.

The candidate index value determining unit 2211 is configured to determine the candidate index value according to a first function value of a first preset function, a value corresponding to a target starting position, a second function value of a second preset function, and a first target offset value.

The first preset function is a preset function corresponding to a target control channel element CCE index value for a search space, the target CCE index value being a minimum CCE index value corresponding to the current PDCCH; the target starting position is a starting position of the resource corresponding to the PUCCH channel configured to carry the HARQ results; the second preset function is a preset function corresponding to a first target value and a second target value, in which the first target value is a value corresponding to sub-frame configuration of a TDD MTC system and a position of the current sub-frame, and the second target value is a number of CCEs included in a physical resource block carrying the current PDCCH; the first target offset is an offset of PUCCH resource carried by the current PDCCH for the HARQ result feedback.

Figure 8:
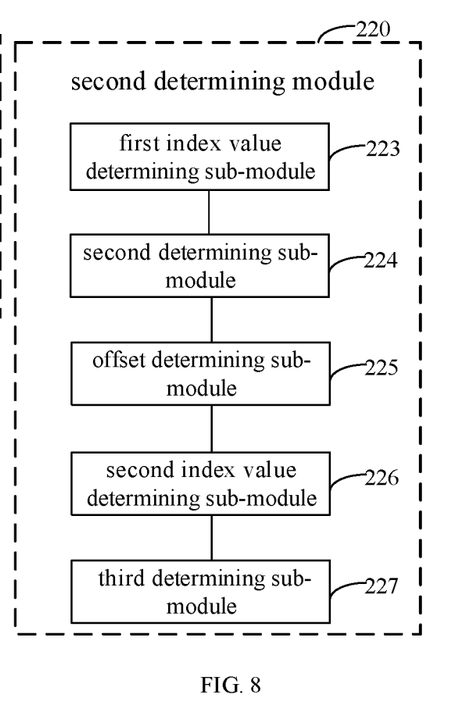
FIG. 8 is a block diagram illustrating another apparatus for hybrid automatic repeat request (HARQ) feedback according to an exemplary embodiment.

Referring to FIG. 8, it is a block diagram illustrating another apparatus for hybrid automatic repeat request HARQ feedback based on the embodiment illustrated in FIG. 5. The second determining module 220 includes a first index value determining sub-module 223, a second determining sub-module 224, an offset determining sub-module 225, a second index value determining sub-module 226 and a third determining sub-module 227.

The first index value determining sub-module 223 is configured to determine a first candidate index value in case that a number of the at least one target PDSCH is more than 1. The first candidate index value is a resource index value corresponding to a first candidate PUCCH in the at least one candidate PUCCH.

The second determining sub-module 224 is configured to determine a PUCCH indicated by the first candidate index value as the first candidate PUCCH.

The offset determining sub-module 225 is configured to determine a second target offset corresponding to each of other candidate PUCCHs. The other candidate PUCCHs are candidate PUCCHs other than the first candidate PUCCH, and the second target offset is a resource offset of a current other candidate PUCCH relative to the first candidate PUCCH.

The second index value determining sub-module 226 is configured to determine a second candidate index value according to a value corresponding to a position where resource of the first candidate PUCCH is located and the second target offset.

The third determining sub-module 227 is configured to determine PUCCHs indicated by the second candidate index value as the other candidate PUCCHs.

Figure 9:
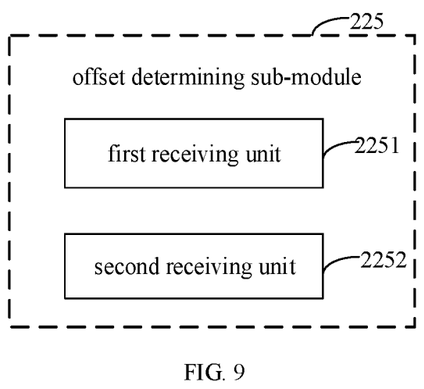
FIG. 9 is a block diagram illustrating another apparatus for hybrid automatic repeat request (HARQ) feedback according to an exemplary embodiment.

Referring to FIG. 9, it is a block diagram illustrating another apparatus for hybrid automatic repeat request HARQ feedback based on the embodiment illustrated in FIG. 8. The offset determination sub-module 225 includes a first receiving unit 2251 or a second receiving unit 2252.

The first receiving unit 2251 is configured to receive the second target offset corresponding to each of the other candidate PUCCHs sent by the base station through a preset signaling.

The second receiving unit 2252 is configured to determine a preset resource offset as the second target offset.

Figure 10:
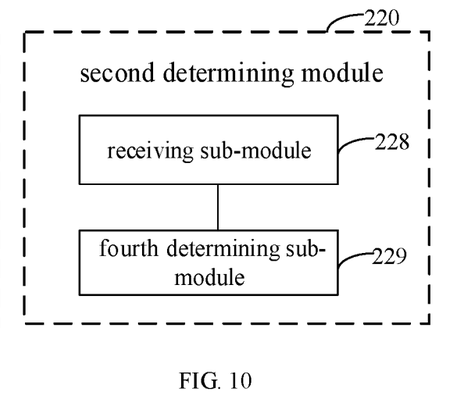
FIG. 10 is a block diagram illustrating another apparatus for hybrid automatic repeat request (HARQ) feedback according to an exemplary embodiment.

Referring to FIG. 10, it is a block diagram illustrating another apparatus for hybrid automatic repeat request HARQ feedback based on the embodiment illustrated in FIG. 5. The second determining module 220 includes a receiving sub-module 228 and a fourth determining sub-module 229.

The receiving sub-module 228 is configured to receive a set of PUCCHs including at least one PUCCH sent by the base station through a first target signaling in case that a number of the at least one target PDSCH is more than 1.

The fourth determining sub-module 229 is configured to determine all PUCCHs in the set of PUCCHs as the candidate PUCCHs.

Figure 11:
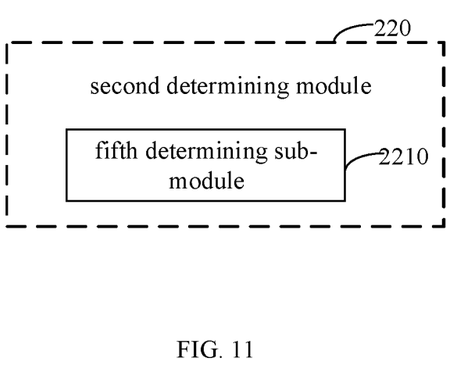
FIG. 11 is a block diagram illustrating another apparatus for hybrid automatic repeat request (HARQ) feedback according to an exemplary embodiment.

Referring to FIG. 11, it is a block diagram illustrating another apparatus for hybrid automatic repeat request HARQ feedback based on the embodiment illustrated in FIG. 5. The second determining module 220 includes a fifth determining sub-module 2210.

The fifth determining sub-module 2210 is configured to determine the target PUCCH and the combined HARQ result in the at least one candidate PUCCH according to a preset mapping relationship between a plurality of target HARQ results, target PUCCH resources and combined HARQ results.

Figure 12:
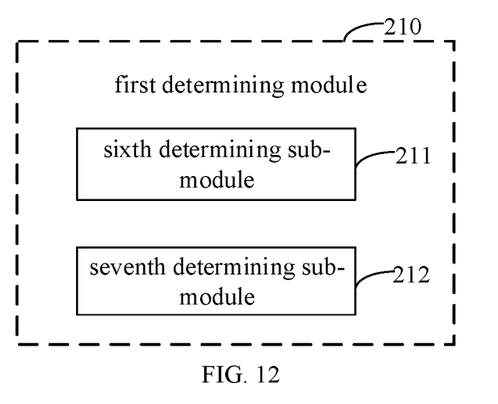
FIG. 12 is a block diagram illustrating another apparatus for hybrid automatic repeat request (HARQ) feedback according to an exemplary embodiment.

Referring to FIG. 12, it is a block diagram illustrating another apparatus for hybrid automatic repeat request HARQ feedback based on the embodiment illustrated in FIG. 5. The first determining module 210 includes a sixth determining sub-module 211 or a seventh determining sub-module 212.

The sixth determining sub-module 211 is configured to determine whether the target HARQ result corresponding to each of the at least one target PDSCH is correct or incorrect according to the at least one target PDSCH scheduled by the current PDCCH.

The seventh determining sub-module 212 is configured to determine, according to the at least one target PDSCH scheduled by the current PDCCH, that all the target HARQ results corresponding to the at least one target PDSCH are all that the current PDCCH is not received.

As for the apparatus embodiments, the relevant part may refer to the descriptions in the method embodiments since they basically correspond to the method embodiments. The apparatus embodiments described above are merely illustrative. The units described above as separate components may or may not be physically separated, and the components displayed as units may or may not be physical units, that is, they may be located in one unit or may be distributed to a plurality of network units. Some or all of the modules may be selected according to actual needs to achieve the objectives of the solutions of the present disclosure. Those skilled in the art may understand and implement them without creative work.

Correspondingly, the present disclosure also provides a computer-readable storage medium having a computer program stored thereon. The computer program is configured to execute any one of the above-described methods for hybrid automatic repeat request HARQ feedback.

Correspondingly, the present disclosure also provides a device for hybrid automatic repeat request HARQ feedback, which is applied to a time division duplexing TDD machine type communication MTC device. The device includes a processor; and a memory for storing instructions executable by the processor;

The processor is configured to:

determine at least one target HARQ result corresponding to at least one target physical downlink shared channel PDSCH, in which the at least one target PDSCH is at least one PDSCH where HARQ results need to be fed back through current sub-frame from all PDSCHs scheduled by current physical downlink control channel PDCCH;

determine a target PUCCH and a combined HARQ result in at least one candidate physical uplink control channel PUCCH according to the at least one target HARQ result, in which the target PUCCH is a PUCCH for which corresponding target PUCCH resource is configured to carry the combined HARQ result, and the combined HARQ result and the target PUCCH resource are configured to identify the at least one target HARQ result; and carry the combined HARQ result in the target PUCCH resource, and sending the target PUCCH to a base station.

Figure 13:
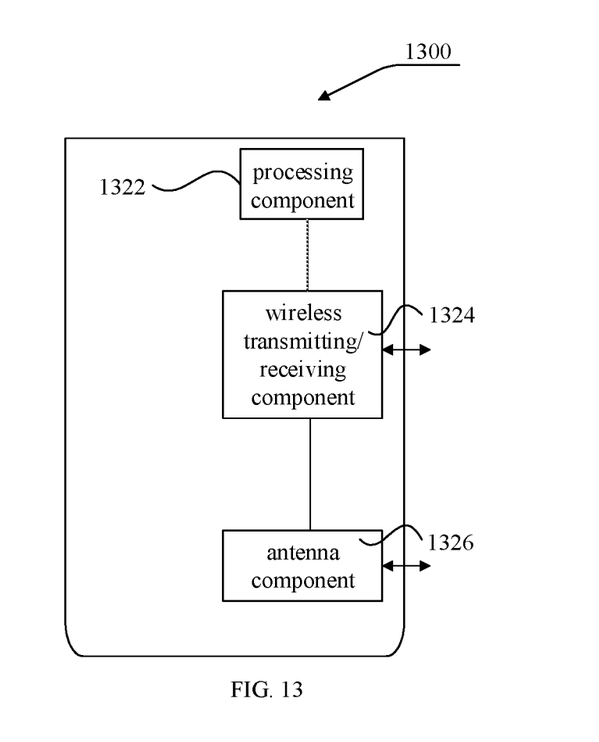
FIG. 13 is a structural schematic diagram illustrating a device for hybrid automatic repeat request (HARQ) feedback according to an exemplary embodiment.

As illustrated in FIG. 13, FIG. 13 is a structural schematic diagram illustrating a device for hybrid automatic repeat request HARQ feedback according to an exemplary embodiment. The device 1300 may be provided as an NB-IOT device. Referring to FIG. 13, the device 1300 includes a processing component 1322, a wireless transmitting/receiving component 1324, an antenna component 1326, and a signal processing part specific to a wireless interface. The processing component 1322 may further include one or more processors.

One of the processors in the processing component 1322 may be configured to execute any one of the above-described methods for hybrid automatic repeat request HARQ feedback which is applied to a time division duplexing TDD machine type communication MTC device.

Those skilled in the art will easily think of other embodiments of the present disclosure after considering the specification and practicing the invention disclosed herein. The present disclosure is intended to cover any variations, uses, or adaptive changes of the present disclosure which follow the general principles of the present disclosure and include common knowledge or conventional technical means in the art that are not disclosed in the present disclosure. The specification and the embodiments are only regarded as exemplary, and the true scope and spirit of the present disclosure are indicated in the following claims.

It should be understood that the present disclosure is not limited to the exact construction that has been described above and illustrated in the accompanying drawings, and various modifications and changes may be made without departing from the scope thereof. It is intended that the scope of the present disclosure only be limited by the appended claims.

What is claimed is:

1. A method for hybrid automatic repeat request (HARQ) feedback, applied to a time division duplexing (TDD) machine type communication (MTC) device, the method comprising:
   determining at least one target HARQ result corresponding to at least one target physical downlink shared channel (PDSCH), wherein the at least one target PDSCH comprises at least one PDSCH from all PDSCHs scheduled by a current physical downlink control channel (PDCCH), and wherein HARQ results corresponding to the at least one target PDSCH are to be fed back through a current sub-frame;
   determining a target PUCCH and a combined HARQ result in at least one candidate physical uplink control channel (PUCCH) according to the at least one target HARQ result, wherein corresponding target PUCCH resource of the target PUCCH is configured to carry the combined HARQ result, and the combined HARQ result and the target PUCCH resource are configured to identify the at least one target HARQ result; and
   carrying the combined HARQ result through the target PUCCH resource, and sending the target PUCCH to a base station.

2. The method of claim 1, wherein in case that a number of the at least one target PDSCH is 1, determining the candidate PUCCH by:
   determining a candidate index value, wherein the candidate index value is a resource index value corresponding to the candidate PUCCH; and
   determining a PUCCH indicated by the candidate index value as the candidate PUCCH.

3. The method of claim 2, wherein determining the candidate index value comprises:
   determining the candidate index value according to a first function value of a first preset function, a value corresponding to a target starting position, a second function value of a second preset function, and a first target offset value;
   wherein the first preset function is a preset function corresponding to a target control channel element (CCE) index value for a search space, the target CCE index value being a minimum CCE index value corresponding to the current PDCCH; the target starting position is a starting position of the resource corresponding to the PUCCH channel configured to carry the HARQ results; the second preset function is a preset function corresponding to a first target value and a second target value, in which the first target value is a value corresponding to sub-frame configuration of a TDD MTC system and a position of the current sub-frame, and the second target value is a number of CCEs included in a physical resource block carrying the current PDCCH; the first target offset is an offset of PUCCH resource carried by the current PDCCH for the HARQ result feedback.

4. Currently Amended) The method of claim 1, wherein in case that a number of the at least one target PDSCH is more than 1, determining the candidate PUCCH by:
   determining a first candidate index value, wherein the first candidate index value is a resource index value corresponding to a first candidate PUCCH in the at least one candidate PUCCH;
   determining a PUCCH indicated by the first candidate index value as the first candidate PUCCH;
   determining a second target offset corresponding to each of other candidate PUCCHs;
   wherein the other candidate PUCCHs are candidate PUCCHs other than the first candidate PUCCH, and the second target offset is a resource offset of a current other candidate PUCCH relative to the first candidate PUCCH;
   determining a second candidate index value according to a value corresponding to a position where resource of the first candidate PUCCH is located and the second target offset; and
   determining PUCCHs indicated by the second candidate index value as the other candidate PUCCHs.

5. The method of claim 4, wherein determining the second target offset corresponding to each of the other candidate PUCCHs comprises:
   receiving the second target offset corresponding to each of the other candidate PUCCHs sent by the base station through a preset signaling; or
   determining a preset resource offset as the second target offset.

6. The method of claim 1, wherein in case that a number of the at least one target PDSCH is more than 1, determining the candidate PUCCH by:
   receiving a set of PUCCHs including at least one PUCCH sent by the base station through a first target signaling; and
   determining all PUCCHs in the set of PUCCHs as the candidate PUCCHs.

7. The method of claim 1, wherein determining the target PUCCH and the combined HARQ result in the at least one candidate physical uplink control channel PUCCH according to the at least one target HARQ result comprises:
   determining the target PUCCH and the combined HARQ result in the at least one candidate PUCCH according to a preset mapping relationship between a plurality of target HARQ results, target PUCCH resources and combined HARQ results.

8. The method of claim 1, wherein determining at least one target HARQ result comprises:
   determining whether the target HARQ result corresponding to each of the at least one target PDSCH is correct or incorrect according to the at least one target PDSCH scheduled by the current PDCCH; or
   determining the target HARQ result corresponding to each of the at least one target PDSCH is that the current PDCCH is not received, according to the at least one target PDSCH scheduled by the current PDCCH.

9. An apparatus for hybrid automatic repeat request (HARQ) feedback, applied to a time division duplexing (TDD) machine type communication (MTC) device, the apparatus comprising:
   a processor; and
   a memory for storing instructions executable by the processor;
   wherein the processor is configured to:
   determine at least one target HARQ result corresponding to at least one target physical downlink shared channel (PDSCH), wherein the at least one target PDSCH is at least one PDSCH from all PDSCHs scheduled by a current physical downlink control channel (PDCCH), HARQ results corresponding to the at least one target PDSCH are to be fed back through a current sub-frame;
   determine a target PUCCH and a combined HARQ result in at least one candidate physical uplink control channel (PUCCH) according to the at least one target HARQ result, wherein corresponding target PUCCH resource of the target PUCCH is configured to carry the combined HARQ result is configured to carry the combined HARQ result, and the combined HARQ result and the target PUCCH resource are configured to identify the at least one target HARQ result; and
   carry the combined HARQ result through the target PUCCH resource, and send the target PUCCH to a base station.

10. The apparatus of claim 9, wherein the processor is further configured to:
    determine a candidate index value in case that a number of the at least one target PDSCH is 1, wherein the candidate index value is a resource index value corresponding to the candidate PUCCH; and
    determine a PUCCH indicated by the candidate index value as the candidate PUCCH.

11. The apparatus of claim 10, wherein the processor is further configured to:
    determine the candidate index value according to a first function value of a first preset function, a value corresponding to a target starting position, a second function value of a second preset function, and a first target offset value;
    wherein the first preset function is a preset function corresponding to a target control channel element (CCE) index value for a search space, the target CCE index value being a minimum CCE index value corresponding to the current PDCCH; the target starting position is a starting position of the resource corresponding to the PUCCH channel configured to carry the HARQ results; the second preset function is a preset function corresponding to a first target value and a second target value, in which the first target value is a value corresponding to sub-frame configuration of a TDD MTC system and a position of the current sub-frame, and the second target value is a number of CCEs included in a physical resource block carrying the current PDCCH; the first target offset is an offset of PUCCH resource carried by the current PDCCH for the HARQ result feedback.

12. The apparatus of claim 9, wherein the processor is further configured to:
    determine a first candidate index value in case that a number of the at least one target PDSCH is more than 1, wherein the first candidate index value is a resource index value corresponding to a first candidate PUCCH in the at least one candidate PUCCH;
    determine a PUCCH indicated by the first candidate index value as the first candidate PUCCH;
    determine a second target offset corresponding to each of other candidate PUCCHs; wherein the other candidate PUCCHs are candidate PUCCHs other than the first candidate PUCCH, and the second target offset is a resource offset of a current other candidate PUCCH relative to the first candidate PUCCH;
    determine a second candidate index value according to a value corresponding to a position where resource of the first candidate PUCCH is located and the second target offset; and
    determine PUCCHs indicated by the second candidate index value as the other candidate PUCCHs.

13. The apparatus of claim 12, wherein the processor is further configured to:
    receive the second target offset corresponding to each of the other candidate PUCCHs sent by the base station through a preset signaling; or
    determine a preset resource offset as the second target offset.

14. The apparatus of claim 9, wherein the processor is further configured to:
    receive a set of PUCCHs including at least one PUCCH sent by the base station through a first target signaling in case that a number of the at least one target PDSCH is more than 1; and
    determine all PUCCHs in the set of PUCCHs as the candidate PUCCHs.

15. The apparatus of claim 9, wherein the processor is further configured to:
    determine the target PUCCH and the combined HARQ result in the at least one candidate PUCCH according to a preset mapping relationship between a plurality of target HARQ results, target PUCCH resources and combined HARQ results.

16. The apparatus of claim 9, wherein the processor is further configured to:
    determine whether the target HARQ result corresponding to each of the at least one target PDSCH is correct or incorrect according to the at least one target PDSCH scheduled by the current PDCCH; or
    determine the target HARQ result corresponding to each of the at least one target PDSCH is that the current PDCCH is not received, according to the at least one target PDSCH scheduled by the current PDCCH.

17. A non-transitory computer-readable storage medium having a computer program stored thereon, wherein the computer program is configured to execute a method for hybrid automatic repeat request (HARQ) feedback, the method comprising:
    determining at least one target HARQ result corresponding to at least one target physical downlink shared channel (PDSCH), wherein the at least one target PDSCH is at least one PDSCH from all PDSCHs scheduled by a current physical downlink control channel (PDCCH), HARQ results corresponding to the at least one target PDSCH are to be fed back through a current sub-frame;

determining a target PUCCH and a combined HARQ result in at least one candidate physical uplink control channel (PUCCH) according to the at least one target HARQ result, wherein corresponding target PUCCH resource of the target PUCCH is configured to carry the combined HARQ result, and the combined HARQ result and the target PUCCH resource are configured to identify the at least one target HARQ result; and carrying the combined HARQ result through the target PUCCH resource, and sending the target PUCCH to a base station.

18. The storage medium of claim 17, wherein in case that a number of the at least one target PDSCH is 1, determining the candidate PUCCH by:

determining a candidate index value, wherein the candidate index value is a resource index value corresponding to the candidate PUCCH; and determining a PUCCH indicated by the candidate index value as the candidate PUCCH.

19. The storage medium of claim 17, wherein in case that a number of the at least one target PDSCH is more than 1, determining the candidate PUCCH by:

determining a first candidate index value, wherein the first candidate index value is a resource index value corresponding to a first candidate PUCCH in the at least one candidate PUCCH;

determining a PUCCH indicated by the first candidate index value as the first candidate PUCCH;

determining a second target offset corresponding to each of other candidate PUCCHs;

wherein the other candidate PUCCHs are candidate PUCCHs other than the first candidate PUCCH, and the second target offset is a resource offset of a current other candidate PUCCH relative to the first candidate PUCCH;

determining a second candidate index value according to a value corresponding to a position where resource of the first candidate PUCCH is located and the second target offset; and determining PUCCHs indicated by the second candidate index value as the other candidate PUCCHs.

20. The storage medium of claim 17, wherein in case that a number of the at least one target PDSCH is more than 1, determining the candidate PUCCH by:

receiving a set of PUCCHs including at least one PUCCH sent by the base station through a first target signaling; and determining all PUCCHs in the set of PUCCHs as the candidate PUCCHs.

* * * * *